(No Model.)
J. H. MARTINDALE.
FRUIT PICKER.
No. 589,009. Patented Aug. 31, 1897.
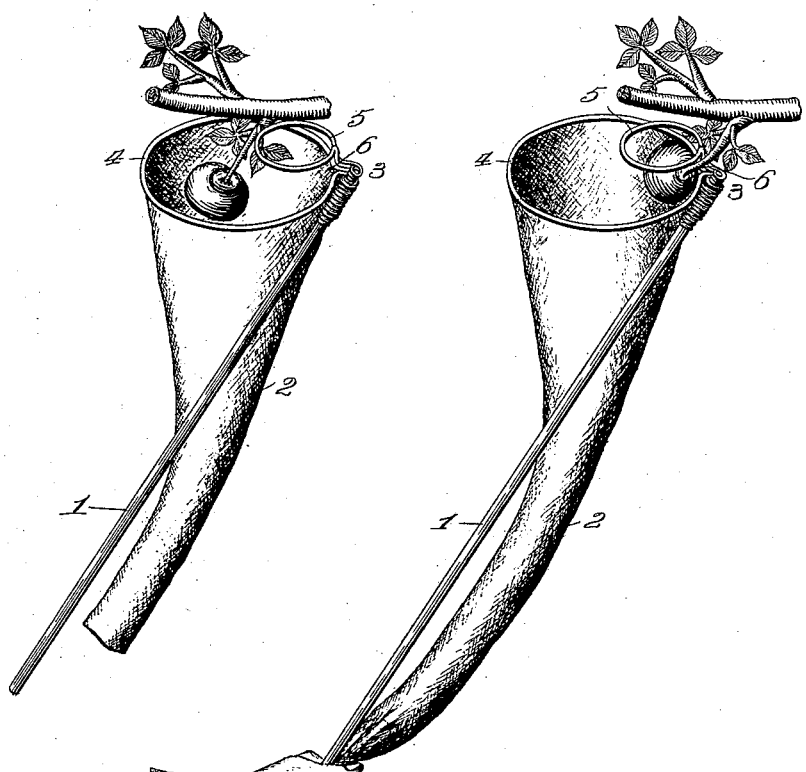

UNITED STATES PATENT OFFICE.

JOHN H. MARTINDALE, OF RUSSELL, PENNSYLVANIA.

FRUIT-PICKER.

SPECIFICATION forming part of Letters Patent No. 589,009, dated August 31, 1897.

Application filed September 15, 1896. Serial No. 605,942. (No model.)

*To all whom it may concern:*

Be it known that I, JOHN H. MARTINDALE, a citizen of the United States, residing at Russell, Warren county, Pennsylvania, have invented certain new and useful Improvements in Fruit-Pickers, of which the following is a specification.

My invention has for its object to provide a fruit-picker which will be very cheap and durable in construction, effective in use, and which will offer the least possibility of interference with the limbs of the tree and consequent interruption of the picking operation while in use.

A further object is to make the parts which constitute the grip relatively adjustable, so as to adapt the implement for use in picking different sizes and kinds of fruit.

My invention consists in certain novel features of construction, which will be hereinafter fully described, and particularly pointed out in the claims.

In the accompanying drawings, Figure 1 is a perspective view of the implement in use, illustrating the manner of approaching the fruit to grip it; and Fig. 2 is a similar view illustrating the manner in which the fruit is gripped, so that it may be pulled off and allowed to fall in the collecting-tube. Fig. 3 is a side elevation of the pair of gripping-rings, one of which supports the collecting-tube, while the other is adjustable relatively to it.

1 represents the staff or handle, and 2 the collecting-bag, which may be constructed and manipulated in the manner well known. Upon the upper end of the staff 1 is mounted the gripping or plucking head 3, constructed of two rings arranged one above the other in an approximately tangential relation and varying in diameter in about the proportion of one to three. The lower or larger ring 4 supports the collecting-tube 2 in proper position to receive the fruit when it drops, and the upper ring 5 is held in such relation to the lower ring that when the implement is passed up beneath the fruit, substantially as shown in Fig. 1, and then moved sidewise the stem will pass into the narrow neck 6 on either side of the ring 5, when the fruit will be firmly gripped and can be pulled from the tree and permitted to drop into the collecting-tube. As it drops the fruit is arrested, as shown in Fig. 2, by the hand of the operator, who holds the tube to the staff, or in some equivalent manner, as shown at A, and after its fall has been arrested it passes into the lower portion of the tube upon releasing the hand A and there remains until sufficient fruit has been collected, after which it may be deposited in the usual manner by releasing the hand B.

A special advantage arises in the use of the ring 5, in addition to its gripping effect, in that it offers no projections or forks or other means for the admission of the limbs or twigs and consequent hindering of the work of picking. Moreover, the shape of the grip formed by the two rings is such as to permit the implement being passed up close to a limb for gripping the fruit, the opening between the gripping-rings being a lateral one and there being one such grip on either side.

A further advantage arises from the fact that the fruit is always in sight until it is finally pulled from the tree, and this adds greatly to the ease in manipulation.

To provide an effective and simple means for connecting the two rings, for making them relatively adjustable, and for mounting them upon the pole, the ends of the wire or rod of which they are formed are wound spirally upon suitable mandrels, so as to form shanks projecting tangentially from the rings. By making the shanks of the proper size one fits within the other and the spiral form of their shanks adapts them to screw one within the other, so as to be not only effectively connected together and held in the proper relation, but to be adjustably connected. This same construction also adapts the smaller shank to be screwed upon the end of the shaft as a means of attachment thereto. The rings are preferably bent at about the angle shown with relation to their shanks, so that the user may hold the gripping-head in an approximately horizontal position while standing off from beneath the picking-point, so that the fruit remains in sight at all times until dropped.

Having thus described my invention, the following is what I claim as new therein and desire to secure by Letters Patent:

1. A fruit-picker, comprising a suitable attaching-shank and two rings projecting at an angle from the shank, and one above the other, so as to leave a space between them in which the stems may enter and permit the fruit to be engaged by the rings, substantially as explained.

2. A fruit-picker, comprising an attaching-shank and two rings of different diameters projecting at an angle from said shank, and with the smaller placed above the larger, a distance suitable to permit the stems to pass between them, and the gripping of the fruit to take place adjacent to the shank as explained.

3. A fruit-picker comprising two rings projecting at an angle from a suitable shank which holds them tangential to the line of said shank and relatively adjustable in said line; the upper ring being of sufficiently smaller diameter than the lower to permit the fruit to pass between their peripheries on the side away from the shank, the said rings being spaced apart a distance suitable to permit the passage of the stems between them, or to cause them to grip the fruit adjacent to the shank, as explained.

4. A fruit-picker, comprising two rings, each having a shank projecting from its periphery in substantially the manner shown, said shanks being made to screw one within the other to render the rings relatively adjustable, as herein explained.

5. In a fruit-picker, a grip comprising two rings formed of rod or wire having the ends wound spirally to form attaching-shanks, which shanks are made to fit one within the other as explained.

JOHN H. MARTINDALE.

Witnesses:
H. S. KNIGHT,
LE BLOND BURDETT.